No. 839,155. PATENTED DEC. 25, 1906.
R. KLEIN.
PHOTOGRAPHIC SHUTTER.
APPLICATION FILED JUNE 16, 1905.

4 SHEETS—SHEET 1.

Witnesses
Walter B. Payne
Clarence A. Bateman

Inventor
Rudolph Klein
By Frederick S. Church
his Attorney

No. 839,155. PATENTED DEC. 25, 1906.
R. KLEIN.
PHOTOGRAPHIC SHUTTER.
APPLICATION FILED JUNE 16, 1905.

4 SHEETS—SHEET 2.

Witnesses
Walter B. Payne
Clarence A. Bateman

Inventor
Rudolph Klein
his Attorney

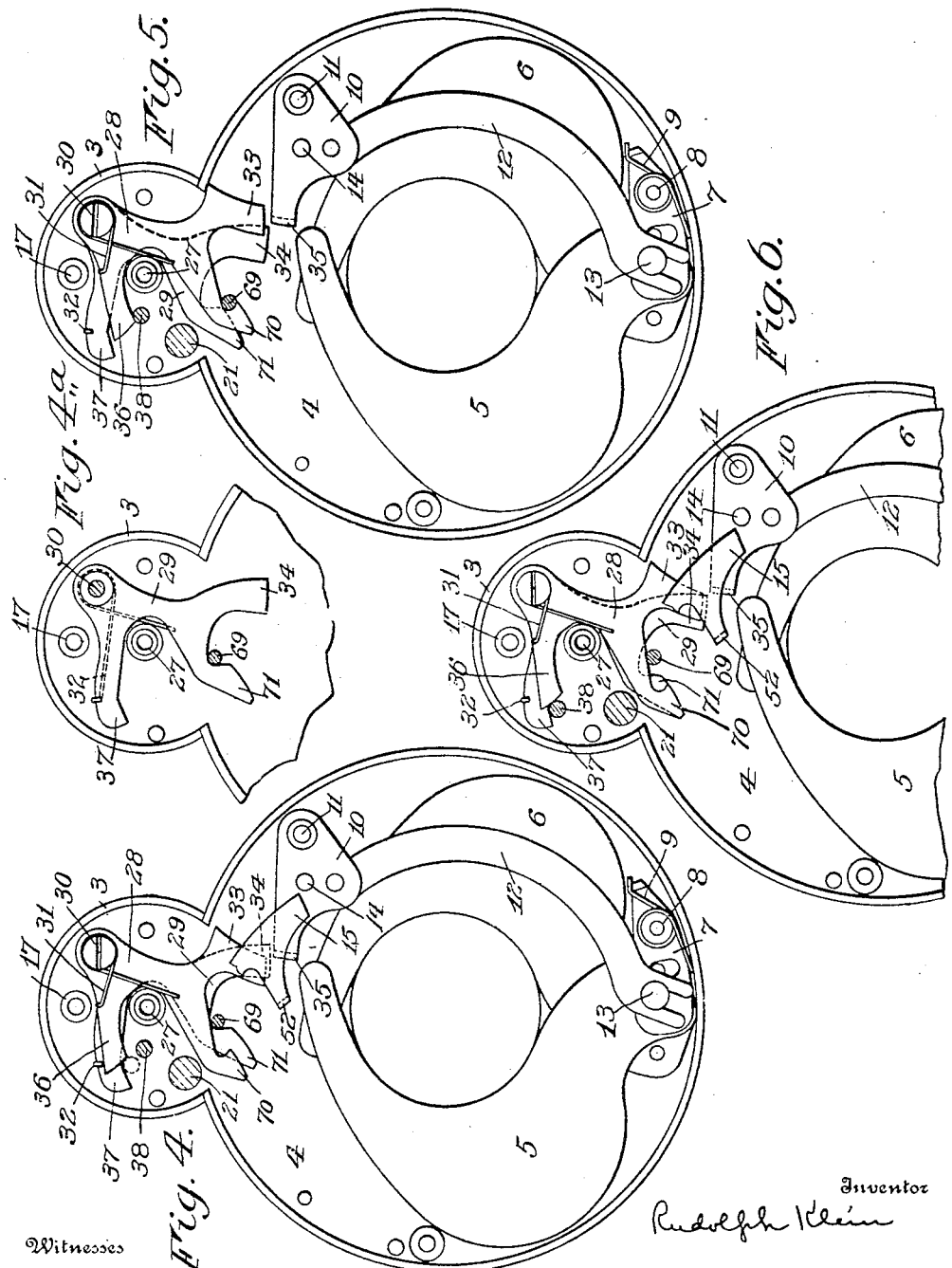

No. 839,155. PATENTED DEC. 25, 1906.
R. KLEIN.
PHOTOGRAPHIC SHUTTER.
APPLICATION FILED JUNE 16, 1905.

4 SHEETS—SHEET 4.

Witnesses
Walter B. Payne
Clarence A. Bateman

Inventor
Rudolph Klein
By Frederick S. Church
Attorney

UNITED STATES PATENT OFFICE.

RUDOLPH KLEIN, OF ROCHESTER, NEW YORK, ASSIGNOR TO BAUSCH AND LOMB OPTICAL COMPANY, OF ROCHESTER, NEW YORK, A CORPORATION OF NEW YORK.

PHOTOGRAPHIC SHUTTER.

No. 839,155.     Specification of Letters Patent.     Patented Dec. 25, 1906.

Application filed June 16, 1905. Serial No. 265,514.

*To all whom it may concern:*

Be it known that I, RUDOLPH KLEIN, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

The present invention relates to improvements in photographic shutters, and has for its object to provide a shutter composed of few parts and which is capable of making time, bulb, and automatically-timed exposures, as well as the instantaneous or snapshot exposure, the several parts of the shutter being simple in construction and arrangement, so that they may be assembled with a minimum amount of labor.

To these and other ends the invention consists in certain improvements and combinations of parts, all as will be hereinafter more fully described, the novel features being pointed out in the claims at the end of the specification.

Figure 1:
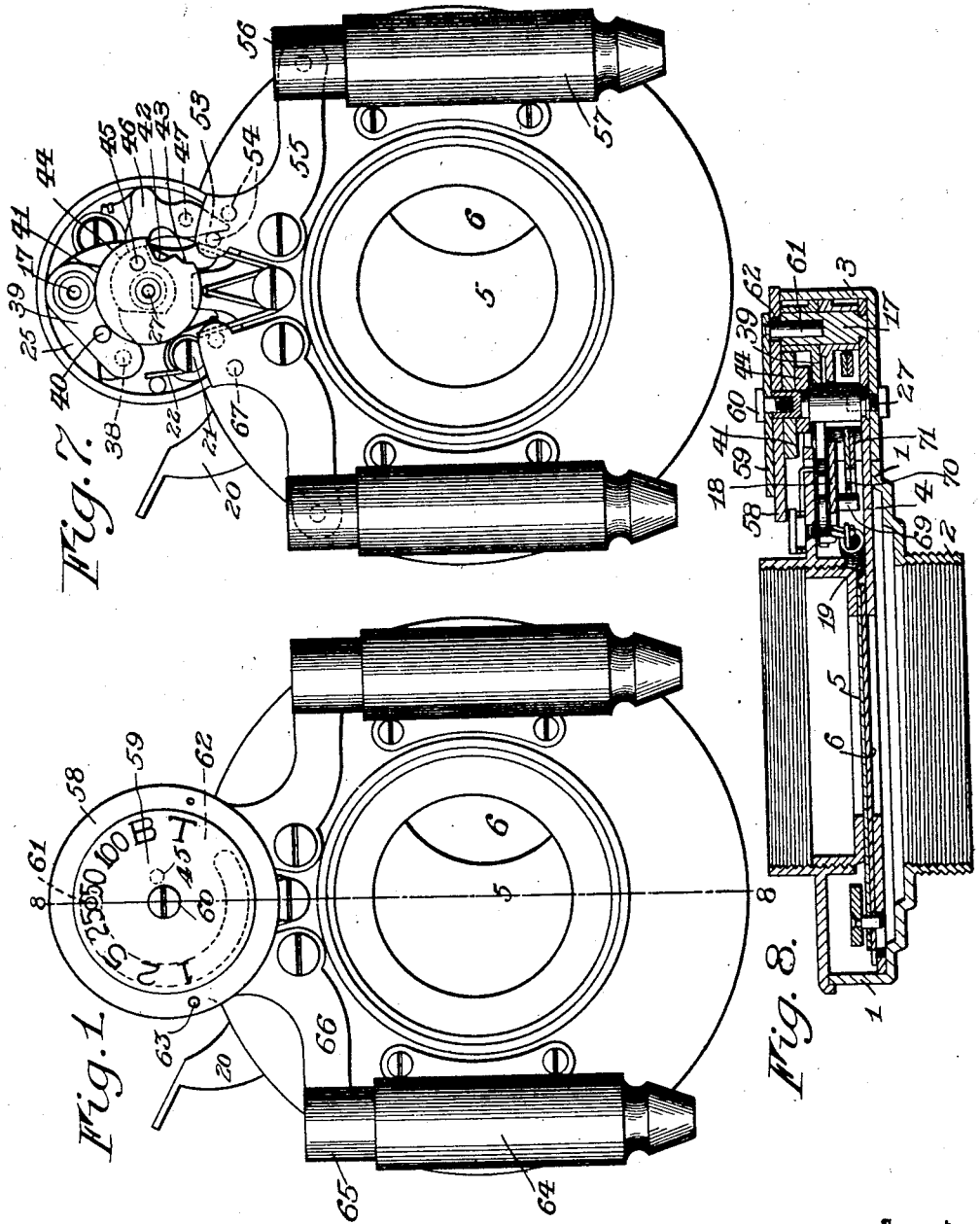
Figure 2:
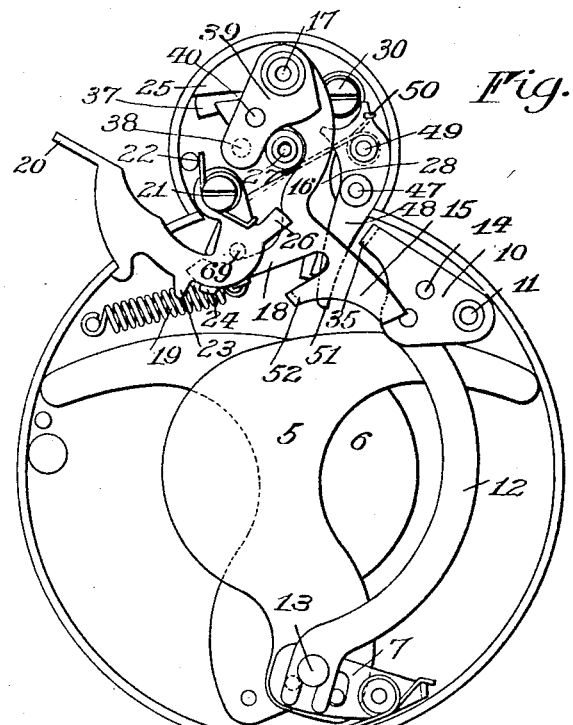
Figure 3:
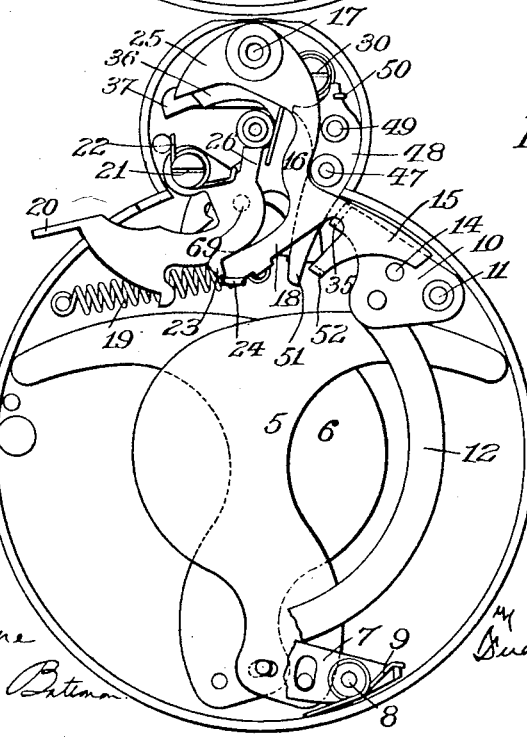
Figure 10:
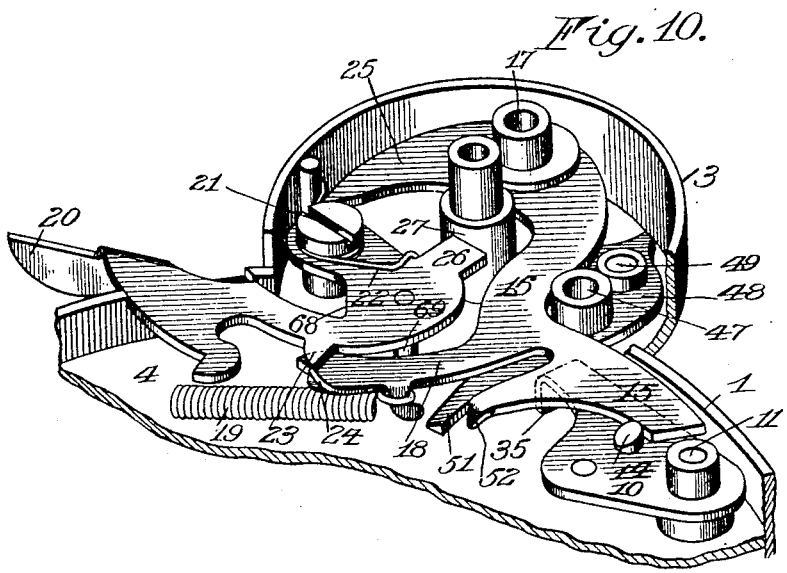
Figure 9:
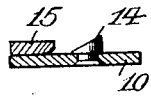

In the drawings, Figure 1 is a front elevation of a photographic shutter constructed in accordance with my invention. Fig. 2 is a view of the shutter with the cover or front plate removed. Fig. 3 is a view similar to Fig. 2, showing the operating and master members in operated position and at a moment immediately prior to the opening of the shutter-blades. Figs. 4, 4ª, and 5 show the bulb and time stops, respectively, in position to hold the shutter-blades in opened position. Fig. 6 shows the parts in position for making instantaneous or automatically-timed exposures. Fig. 7 is a front view of the shutter with the index and setting device removed. Fig. 8 is a sectional view on the line 8 8 of Fig. 1. Fig. 9 is a sectional view, enlarged, taken on the line *x x* of Fig. 2, showing the latch connection between the master and exposure members; and Fig. 10 is a perspective view of the upper portion of the shutter on an enlarged scale, showing the coöperative relation of the stops and the operating and master members.

The same numerals of reference in the several figures indicate similar parts.

The present embodiment of my invention is shown in connection with a shutter of the kind adapted to carry the lens combinations and is formed for attachment directly to the front of the camera, embodying in the present instance an annular casing 1, having a rearward extension 2, threaded to receive the rear-lens combination and for attachment to the camera, an extension 3 extending upwardly from the casing 1 to form a supplemental chamber for a portion of the shutter mechanism.

Within the casing 1 is secured a septum 4, at the rear side of which is generally arranged the usual adjustable diaphragm for altering the size of the exposure-aperture. At the forward side of this septum are pivoted the shutter-blades 5 and 6, which are arranged to cover and uncover the aperture through the shutter-casing, a lever 7, pivoted at 8 and provided with an operating-spring 9, being connected to these plates and normally operating under the action of its spring to move the plates toward and retain them in closed position. An exposure member 10 is pivoted at 11 to the septum and is provided with a lever 12, having a slotted end coöperating with a pin 13 of the link 7 for causing the operation of the latter to open the shutter-plates. This exposure member is provided with a projection 14, having an incline toward one side, and this projection is arranged in the path of the arm 15 of the master member 16, the latter being pivoted on the post 17 and provided with an extension 18, to which a spring 19 is connected, the tension of this spring 19 normally operating the master member toward the position shown in Fig. 2.

An operating member 20, having an operating portion projecting through the shutter-casing, is pivoted at 21 and is operated upon by the spring 22, encircling the pivot 21, to return it to the normal position. (Shown in Fig. 2.) This operating member has a lateral spur or projection 23, arranged to move into the path of and engage the corresponding projection 24 on the master member, and as the latter is operated toward the position shown in Fig. 3 the arm 15 thereon will pass over the incline of the beveled projection 14 on the exposure member, a relative lateral motion being permitted between the master and exposure members by the resiliency of these parts.

Immediately after the arm 15 engages behind the projection 14 the projection 23 of the operating member will trip off of the projection 24 of the master member, permitting the latter to operate from the position shown in Fig. 3 to the position shown in Fig. 2 and in doing this will operate the exposure member, which in turn will cause the shutter-blades to be opened. As the master and exposure members are pivoted on different centers, the portions 16 and 14, respectively, will move through intersecting arcs, and consequently as the master member returns toward its normal position the portion 15 thereon will disengage from the projection 14 of the exposure member, permitting the latter and the shutter-blades to return to normal position under the action of the spring 9 of the lever 7. The motion of the master member toward its normal position is limited by the extension 25, arranged to coöperate with the adjacent portion of the casing, and motion of the operating member toward operated position is limited by the projection 26 engaging the post or standard 27.

The parts thus far described are sufficient for making the so-called "instantaneous exposures"—that is, an exposure in which the shutter-blades are momentarily opened and immediately closed—the duration of the exposure in each case being substantially the same; but it is often necessary to provide for automatically-timed exposures of different periods of duration and also for the time and bulb exposures, and in order to provide for these exposures, I employ the time and bulb stops 28 and 29, respectively, both of which are pivoted at 30 and provided with the operating-springs 31 and 32, the normal operation of which tends to move the heels 33 and 34, respectively, of the time and bulb stops into the path of a projection 35, formed on the free end of the exposure member 14, extensions 36 and 37, respectively, being provided on the time and bulb stops to coöperate with the projection 38, the latter being mounted on an adjustable arm 39, pivoted on the post 17, and this adjustable arm is also provided with an upwardly-extending projection 40, arranged to coöperate with the periphery of a cam 41, the latter being rotatably mounted on the standard 27 and provided with the recesses 42 and 43, respectively, in its periphery, into which the projection 40 of the adjustable arm 39 is adapted to rest alternately for making time and bulb exposures, respectively, it being understood that rotation of the cam 41 into the different positions will permit the arm 39 to operate in such a way as to shift the projection 38 thereon in its relation to the extensions 36 and 37, respectively, of the time and bulb stops.

Beneath the cam 41 and on the post 27 is rotatably mounted a second cam 44 connected to rotate in unison with the cam 41 by means of the pin 45 on cam 44 coöperating with an aperture in cam 41, the periphery of this cam being provided with a spiral portion arranged to coöperate with a finger at one end of the lever 46, the latter being pivoted at 47 to an arm 48, which in turn is pivoted at 49 and provided with a spring 50, normally operating the said arm toward the right. The free end of this arm 48 is provided with a beveled extension 51, which is arranged in the path of a corresponding lateral extension 52 on the master member, so that as the latter is moved from the normal position it will trip over the beveled extension 51; but when it is returned to normal position under the action of the spring 19 it will engage the extension 51 to move the arm 48 to the left, the extension 51 disengaging from the projection 52 of the master member during the latter's return motion by reason of the parts 16 and 48 moving in intersecting arcs about the pivots 17 and 49, respectively. As the lever 46 is connected at 47 to this arm 48, the motion of the latter will be imparted to this lever, causing the lower end 53 thereof to be moved first to the left as the master member is returning to normal position and then back to the right under the action of the spring 50 of the arm 48, and the lower end 53 of the lever 46 is confined between the projections 54 on the pivoted arm 55. The free end of the latter is connected to a plunger 56, operating in the cylinder 57, and consequently the motion of the shutter mechanism will be retarded, and by rotating the cam 44 so as to bring the different portions of its periphery into engagement with the finger of the lever 46 it will be observed that the stroke or degree of motion of the plunger 56 can be varied so as to alter the duration of time required by the parts in completing the exposure.

Over the cam 41 is fitted a setting or adjusting-plate 58, which is rotatable on the standard 27 and is provided with an aperture to receive the pin 45, so that rotation of this adjusting-plate 58 will cause the cams 41 and 44 to rotate in unison, a dial 59 being fitted over the adjusting-plate 58 and secured to the post 27 by the screw 60, a pin 61 on the dial extending through the segmental slot 62 of the adjusting-plate and engaging in an aperture in the post 17 to prevent rotation of the dial. This dial is provided with appropriate indicia corresponding with the different exposures and with which the indicator 63 in the adjusting-plate is adapted to coöperate. For instance, the dial is provided with the numerals "1" "2" "5" "25" "50" "100" "B" "T," which designate, respectively, one second, and the fractions "$\frac{1}{2}$," "$\frac{1}{5}$," "$\frac{1}{25}$," "$\frac{1}{50}$," and "$\frac{1}{100}$," parts of a second, while the letter "B" indicates the position of the indicator 63 for the bulb exposure, and the letter "T" designates the position it should occupy for the time exposure.

The shutter is equipped with a motor of any desired form for enabling the shutter to be manipulated by the use of the well-known bulb and tube, the motor in the present instance consisting of a cylinder 64, having a plunger 65 operating therein and connected to a pivoted lever 66, the opposite end of the latter being provided with the projection 67, arranged to coöperate with the portion 68 of the operating member to cause the operation of the latter.

In operating a shutter of the kind described time exposures are obtained by setting the plate 58 so that the indicator 63 thereon registers with the mark "T" on the dial. When the indicator is moved into this position, the plate 58 will cause the cam 41 to be rotated into such a position that the recess 42 therein is opposite to the projection 40 on the arm 39, and this will permit the latter to move into such a position that the projection 38, carried thereby, will be entirely clear of the coöperating portions 36 and 37, respectively, of the time and bulb stops. Then assuming that the operating member is depressed into the position shown in Fig. 3 it will be observed that the projection 23 thereon, coöperating with the projection 24 of the master member, will cause the latter to be moved toward the right, the arm 16 thereon passing freely over the incline on the projection 14 of the exposure member, the parts being shown in this position in Fig. 3 at a moment before the projections 23 and 24 have disengaged. Disengagement of the projections 23 and 24 of the operating and master members, respectively, will permit the latter to return to normal position under the action of its spring 19, and as this spring is superior or of greater strength than the spring 9, which normally operates to close the shutter-blades, the arm 15 of the master member, coöperating with the projection 14 of the exposure member, will cause the latter to be operated into a position similar to that shown in Fig. 4, opening the shutter-blades and permitting the heel 34 of the bulb-stop to move into the path of the projection 35 on the exposure member, thus retaining the latter in operated position with the shutter-blades open. The master member at this moment will have tripped off of the projection 14 of the exposure member, and the operating member 20 will return toward its normal position until the projection 69 thereon engages the catch 70 on the time-stop, and this will prevent its complete return to normal position, and at the same time the heel 33 of the time-stop will move into the path of the projection 15 of the exposure member to retain the latter in operated position. A second operation of the member 20 will move the projection 69 thereon upwardly about the pivot 21, engaging the time-stop adjacent to the catch 70 thereon and causing the stop to be operated to withdraw its heel 33 from the path of the projection 15 of the operating member, and as the heel 34 of the bulb-stop is somewhat longer than that of the time-stop it will engage the projection 35 laterally, and thus be held out of the path of the projection 35 of the exposure member, and the latter is free to return to normal position under action of the spring 9, and in this way the shutter-blades are closed.

Bulb exposures may be obtained by setting the indicator so as to register with the mark "B" on the dial, the projection 40 of the arm 39 this time resting in the recess 43 of the cam 41, thus bringing the projection 38 into operative relation with the extensions 36 and 37 of the time and bulb stops, as shown in dotted lines, Fig. 4, and full lines in Fig. 6, and as the extension 36 of the time-stop 28 projects forwardly it will engage the projection 38 before the said stop has operated sufficiently to move its heel 33 into the path of projection 15 of the exposure member, while the extension 37 of the bulb-stop is so arranged that the projection 38 does not prevent its operation. As the operating member is depressed the master member is moved to the right until it has engaged behind the projection 14 thereon and has been tripped from the spur 23 of the operating member, and as the master member returns toward normal position the exposure member is operated to open the shutter-blades and is held in this position by the heel 34 of the bulb-stop as long as the operating member remains in operated position, the projection 69 thereon at this time permitting the arm 71 of the bulb-stop to move sufficiently to enable the heel 34 of the stop to move into the path of the projection 15 of the exposure member. When the operating member returns to normal position, the projection 69 thereon will coöperate with the arm 71 of the bulb-stop to retract the heel 34 of the latter from the path of projection 15 of the exposure member, permitting the latter to return to normal position and the shutter-blades to close under action of the spring 9.

Automatically-timed exposures are obtained by setting the indicator at the desired numeral from "1" to "100," it being understood that numeral "1" designates an automatically-timed exposure of one second and "100" designates an exposure of one one-hundredth part of a second duration, the intermediate numerals designating exposures of correspondingly-proportioned durations.

Assuming the indicator to be set at "1," it will be observed that cam 41 occupies such a position that the projection 40 rests on a high part of its periphery, and consequently the time and bulb stops will both be held from operation by the projection 38 engaging the extensions 36 and 37 thereof in the manner shown in Fig. 6, while the finger of the lever 46 rests opposite to the low portion of the cam 44. As the operating member is depressed the master member moves toward the right and in doing so causes the lateral projection 52 thereon to trip past the arm 51 of the lever 48 without operating it; but as the master member returns to normal position the projection 52 of the master member engaging behind the arm 51 of the lever 48 will cause the latter to be operated toward the left. As the lever 48 is operated in this direction the lever 46, which is pivoted on lever 48 at 47, will be oscillated, one end of lever 48 being connected to arm 55 of the retarding device, the finger at the opposite end of the lever 48 engaging the cam-surface of cam 44 as a fulcrum, and in this way the motion of the master member will be retarded, as the operating force thereof is applied to the lever 48 at the point 47 and it cannot complete its motion except by operating the retarding device through the arm 55. This retarding action takes place before the master member disengages from the projection 14 of the exposure member, the retarding action thereby serving to delay the closing of the shutter-blades, and after this disengagement has occurred the projection 52 of the master member will disengage from arm 51 of the lever 48, permitting the return of the retarding device and connected parts to normal position. In setting the shutter for automatic exposures of shorter periods of duration the effect is to bring lower portions of cam 44 opposite to the fulcrum end of lever 46, and consequently the lever 48 will operate through a greater distance before the fulcrum engages the cam, resulting in a shorter stroke at the retarding device and a shorter exposure by the shutter-blades. The arm 51 of lever 48 will be actuated at every operation of the master member; but it will not set the retarding device into operation in making time and bulb exposures, for at this time the fulcrum of lever 46 will be opposite to a low or cut-away portion of cam 44.

A photographic shutter constructed in accordance with my invention is capable of making the time, bulb, and the automatically-timed exposures of various durations, and yet is not only composed of a few simple parts, but is so constructed and arranged that the labor required in assembling the shutters is reduced materially, it being observed that the main casing of the shutter is practically free of mechanism, while the main operating parts of the shutter are superposed compactly upon the several pivots in the upper auxiliary chamber, where they are conveniently ascessible, and the construction and arrangements of the parts whereby the various kinds of exposures is obtained are such that the operation of the shutter is reliable at all times and is not liable to get out of working order.

I claim as my invention—

1. In a photographic shutter, the combination with the movable shutter-blades, an exposure member for operating them, and a master member for operating the exposure member, of a stop for controlling the operation of the exposure member independently of the master member, a projection for preventing operation of the stop, and an adjustable cam for adjusting the position of the projection.

2. In a photographic shutter, the combination with the spring-actuated shutter-blades, and a master member for opening the blades, of a stop for controlling the operation of the shutter-blades, a pivoted arm carrying a projection adjustable relatively to the stop for controlling the operation of the stop, and a setting device embodying a cam for adjusting the position of the projection.

3. In a photographic shutter, the combination with the spring-actuated shutter-blades, and a master member for operating them, of time and bulb stops for controlling the operation of the blades each having extensions thereon, a movable projection arranged to permit the free operation of both stops, or prevent the operation of one or both of them according to the position occupied by the projection, an adjustable arm carrying said projection and a setting device having a cam thereon operating on the said arm to adjust the position thereof for different kinds of exposures.

4. In a photographic shutter, the combination with the spring-actuated shutter-blades, a master member for operating them, and an operating member for actuating the master member, of stops coöperating with the operating member and controlling the operation of the shutter-blades, a pivoted arm having a projection arranged to move into and out of the path of the stops, for controlling their operation, and also having a second projection thereon, a setting device and a cam operated by the setting device and coöperating with the second projection of the pivoted arm for adjusting the latter for different kinds of exposures.

5. In a photographic shutter, the combination with the movable shutter-blades, a spring-actuated lever normally operating to close the blades, an exposure member connected to the lever by a link, and a master member arranged to engage the exposure member for operating it, of a stop coöperating with the exposure member for controlling the operation of the shutter-blades, independently of the master member.

6. In a photographic shutter, the combination with the movable shutter-blades, and a spring-actuated master member for operating them, of a retarding device, a lever coöperating at one end with the retarding device and at its opposite end with a fulcrum, and an arm pivoted to the lever intermediate its ends and coöperating with the master member for controlling the speed thereof.

7. In a photographic shutter, the combination with the movable shutter-blades, and a spring-actuated master member for operating them, of a retarding device, an arm arranged to be actuated in one direction by the master member, a lever operated thereby coöperating at one end with the retarding device, and a cam coöperating with the opposite end of the lever for adjusting the degree of motion thereof and thus regulate the speed of the master member.

8. In a photographic shutter, the combination with the movable shutter-blades, and a spring-actuated master member for actuating them, of a retarding device, an arm having a spring normally operating it in a reverse direction from that of the master member, and arranged to be actuated by the latter under the action of its spring, a pivoted lever operated by the arm having a portion coöperating with the retarding device, and a rotatable cam coöperating with the lever as a fulcrum for adjusting the degree of motion thereof.

9. In a photographic shutter, the combination with the movable shutter-blades, and a spring-actuated master member for actuating them, of stops for controlling the operation of the shutter-blades, an arm having a projection thereon for controlling the operation of the stops and having a second projection thereon, a retarding device coöperating with the master member for regulating the speed of movement thereof, and cams loosely mounted on a common pivot, one of the cams coöperating with the second projection on the arm for controlling the stops and the other cam coöperating with the operating parts of the retarding device for controlling the operation of the latter.

10. In a photographic shutter, the combination with the movable shutter-blades, and a master member for actuating them, of stops for controlling the operation of the shutter-blades, an arm having a projection thereon for controlling the operation of the stops and having a second projection thereon, a retarding device coöperating with the master member for controlling the speed thereof, and a pair of separate cam-plates loosely mounted on a common pivot and connected to operate in unison by a pin on one resting in an aperture in the other, one of the cams coöperating with the second projection on the arm for controlling the operation of the stops, the other cam coöperating with the operating parts of the retarding device.

11. In a photographic shutter, the combination with a casing, movable shutter-blades inclosed therein, said casing having a removable cover and a supplemental casing connected to the main casing, of a master member pivoted within the supplemental casing for operating the shutter-blades, stops pivoted within the supplemental casing for controlling the operation of the shutter-blades, a retarding device, and regulating devices for the retarding device mounted within the supplemental casing and coöperating with the master member, and an adjusting-plate forming a cover for the supplemental casing removable independently of the cover of the main casing.

12. In a photographic shutter, the combination with a main casing, movable shutter-blades inclosed therein, a cover-plate for said casing and a master member for operating the blades, of a supplemental casing adjoining the main casing, devices inclosed therein for controlling the exposures produced by the shutter-blades, a pivot-post, a cam rotatable on said post for adjusting said controlling devices, a rotatable setting-plate mounted on the post and operatively connected to the cam, and a non-rotatable dial-plate mounted on the post above the setting-plate and serving as a cover for the supplemental casing removable independently of the cover-plate of the main casing.

13. In a photographic shutter, the combination with a main casing, movable shutter-blades inclosed therein, a master member for operating the blades, and a cover-plate for said casing, of a supplemental casing adjoining the main casing, devices inclosed therein for controlling the exposures produced by the shutter-blades, a device for adjusting the controlling devices, a pivot-post arranged in the supplemental casing, a setting-plate rotatable thereon having a segmental slot therein and a dial-plate secured to the post above the setting-plate and having a pin extending through the slot of the setting-plate and engaging a relatively fixed portion of the casing for preventing rotation of the dial-plate, said plate serving as a cover for the supplemental casing separate from the cover-plate of the main casing.

14. In a photographic shutter, the combination with the casing inclosing the movable shutter-blades, and a master member for operating them, of devices for controlling the kinds and durations of exposures produced by the shutter-blades, a post, cams separately and loosely mounted on the post and coöperating with their respective controlling devices, a setting-plate loosely mounted on the post, the said plate and the cams being operatively connected to rotate in unison by a pin on one of the parts resting in apertures in the others, and a dial-plate secured to the post above the cams and setting-plate and held from rotation by a projection engaging a relatively fixed portion of the shutter.

RUDOLPH KLEIN.

Witnesses:
 G. WILLARD RICH,
 CLARENCE A. BATEMAN